United States Patent [19]

Flynn et al.

[11] 3,854,746

[45] Dec. 17, 1974

[54] COLLAPSIBLE ICE SHELTER AND SLED

[76] Inventors: Errol W. Flynn, 9845 84th St. S.E., Alto, Mich. 49302; Gene E. Mutschler, 1063 Dahlia, Wayland, Mich. 49348

[22] Filed: June 1, 1973

[21] Appl. No.: 366,185

[52] U.S. Cl. .............................................. 280/12 S
[51] Int. Cl. ............................................ B62b 13/16
[58] Field of Search ............ 280/12 S, 12 R, 18, 19; 296/1 R; 52/71, 66, 70

[56] References Cited
UNITED STATES PATENTS

| | | | |
|---|---|---|---|
| 2,473,076 | 6/1949 | Scheibner | 280/12 S |
| 2,737,397 | 3/1956 | Turner | 280/12 S |
| 2,780,471 | 2/1957 | Lempke | 280/12 S |
| 3,017,194 | 1/1962 | Anderson | 280/18 |
| 3,492,015 | 1/1970 | Kuhn | 280/12 R |

Primary Examiner—Robert R. Song
Attorney, Agent, or Firm—Price, Heneveld, Huizenga & Cooper

[57] ABSTRACT

A collapsible fishing shanty having top, bottom, front, rear and side panels hinged together and foldable between an open position wherein a generally rectangular enclosure is provided with an access door and partially open bottom for fishing and a collapsed position wherein the panels lie stacked in accordion fashion in an interconnected flush coplanar relationship, two of the opposed wall panels having first and second panel portions hinged together to permit inward accordion type folding intermediate the other opposed wall panels. One of the wall panels has a pair of runners along an exposed surface forming a sled for transportation in the collapsed position. Preferably, the panels are all molded plastic and the hinges are a living fabric extending the length of each related panel forming a sealed enclosure.

12 Claims, 5 Drawing Figures

COLLAPSIBLE ICE SHELTER AND SLED

BACKGROUND OF THE INVENTION

1. Field of Invention

This invention relates to collapsible frames and more particularly, an interconnected collapsible ice fishing shanty which forms a sled in its collapsed position.

2. Description of the Prior Art

The conventional ice shanty today is very little different than the shanty used years ago. Principally, it is a wooden structure built around a frame which must be trucked or carted onto the ice and removed in its original and final shape and stored at some convenient location. There have been a variety of prior art suggestions setting forth a variety of collapsible or partially collapsible frames some of which include runners so that the collapsed framework can be transported easily across the top of the ice. None of these however have proven successful. Several factors have contributed to their unsuccessful history. One is the overall cost. A second is that they do not provide a wind sealed enclosure of adequate size and rigidity to withstand the weather during their normal use. A third drawback is the complexity in constructing and dismantling or collapsing the structures, the prior art proposals generally requiring more than one person to both set up and take down the particular collapsible structure. The overall weight of the particular components has contributed to this difficulty as well as the necessity of using mechanical fasteners and/or other means for joining different components of the structure together. Most of the prior art proposals known to applicants which utilize some type of runner mechanism in assisting the transportation of the collapsed structure locate the runners on the bottom or floor panel. This not only elevates the constructed shanty thereby creating a space for a draft to develop, but also reduces the stability of the structure in that if the wind conditions are right, the size of the shanty is sufficient to act as an air frame which will want to travel in the direction of the runners. Thus, in addition to not being wind proof, significant staking or anchoring is required.

In summary, the principal drawbacks are the cost of known prior art suggestions and difficulty in assembling or disassembling for transportation across the ice. Thus, there is a need for a new and improved collapsible ice fishing shanty which is competitive with the conventional ones in use today and yet sufficiently easy to assemble and disassemble that one person can readily perform the entire operation.

SUMMARY OF THE INVENTION

In accordance with the invention, a collapsible ice fishing shanty includes front, rear and sidewall panels. Two opposed panels include first and second panel portions hingedly connected to each other and to the adjacent opposed panels whereby the panels are foldable between an erected position wherein the first and second panel portions lie in the same plane forming a single wall panel, and a collapsible position wherein the second portions lie in parallel flush planes intermediate the other opposed panels in accordion fashion. A roof and floor panel are hingedly connected to one of the other of the opposed panels and foldable relative thereto between an erected position wherein the roof panel covers the top of the enclosure and the floor panel covers at least a portion of the bottom of the enclosure when the first and second panel portions are in the erected position and a collapsed position wherein the roof and floor panels are in a parallel flush plane with the one panel. One of the wall panels also includes means defining an access opening into and out of the enclosure and a door hingedly covering the access opening and one of said other of said opposed wall panels includes a pair of runners fixed to the outer side forming a sled for transporting the sled when the panels are in collapsed position.

In narrower aspects of the invention, the roof panel includes a center portion which in the open position fits snugly between the wall panels thereby indexing the wall panels into a rectangular enclosure. The floor panel is foreshortened to provide an opening for fishing extending the width of the shanty. The combined length of the roof and floor panel preferably equal the height of the shanty so that when they are folded into collapsed position, they form a continuous thickness.

In other significant aspects of the invention, all of the panels are preferably comprised of a molded or foamed plastic and the hinged connections between each of the panels is formed by a living fabric extending the length of each related panel to form a weather seal along each corner when the shanty is erected.

The molded or foamed plastic panel construction is extremely inexpensive and economically competitive with present ice shanty construction. The simplicity with which the shanty can be erected or collapsed is in part assured by the complete interconnection with each of the panels so that when a single person brings the collapsed shanty into position on the runners, he merely folds over the roof and floor panels and pushes up the top exposed panel until the foldable sidewall portions are planar whereupon the roof panel is swung down into position indexing the wall configuration. The structure is then tipped into its upright position with the floor panel folded over. The shanty is then ready for use for its intended purposes. The living hinges are essentially friction free while at the same time they may be comprised of a plastic type fabric which prevents wind passage so that the shanty is effectively sealed. Since the entire weight of the shanty rests on the flat bottom, inadvertent movement due to normal wind conditions is inhibited as well as uncomfortable wind drafts.

DESCRIPTION OF THE PREFERRED EMBODIMENT

Figure 1:
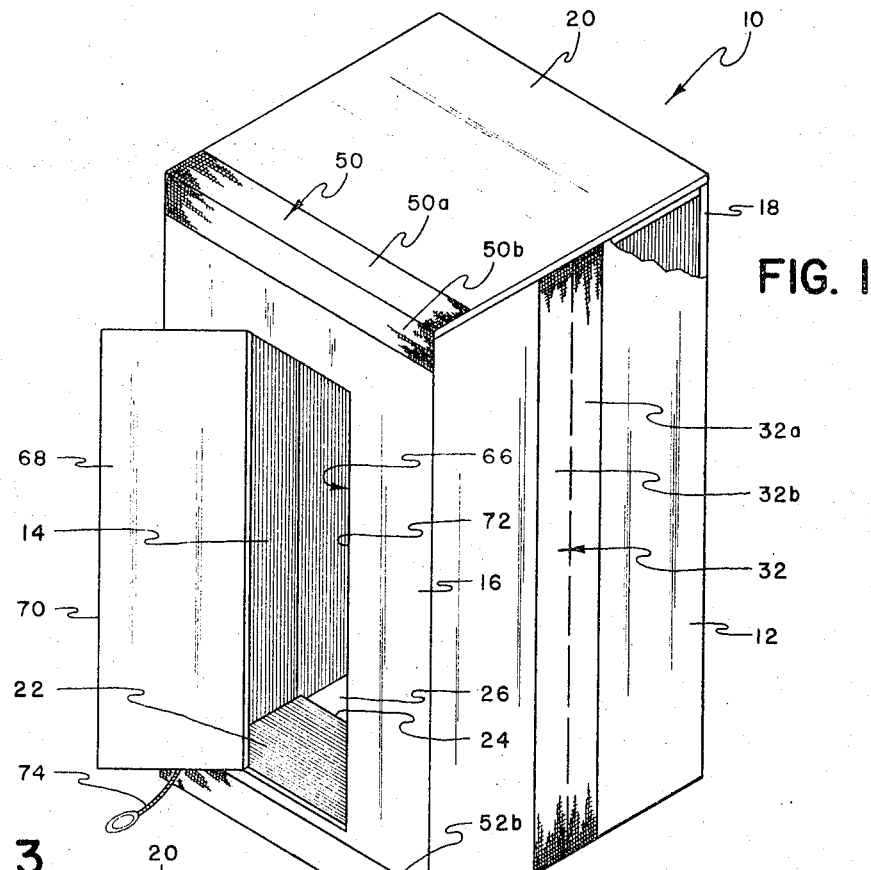
FIG. 1 is a perspective view of the ice shanty in its erected position.

Referring now to the drawings in detail and particularly FIG. 1, an ice fishing shanty 10 is illustrated comprising an upstanding rectangular enclosure having sidewall panels 12 and 14, a front panel 16, rear panel 18, roof panel 20 and floor panel 22. The floor panel does not extend entirely from the front to the rear of the shanty and hence the distance from the terminal edge 24 of floor 22 to rear panel 18 forms an opening 26 extending the entire width of the shanty. This opening forms an access for fishing when the shanty is erected. Dimensionally, the shanty is 4 foot square and approximately 6 foot high. This size shanty is ideal for one person although it will be appreciated that the particular dimensions are not significant and indeed in cases of more than one person desiring its use at one time, larger sizes would be preferred.

All of the panels are preferably comprised of a molded or foamed plastic and one aspect of the invention is its overall weight so that it can be easily assembled by one person. A shanty of the dimensions given above made in accordance with the invention will weigh approximately 35 pounds. It will be appreciated that this is a very manageable weight for the average person.

All of the panels described above are interconnected as described hereinafter by fabric type hinges which extend the full length of each joint. The preferred material used is wind resistant and hence the erected enclosure is completely wind proof. A variety of different types of fabrics can be utilized such as nylon, canvas, fiberglass, etc., the principal object being that the hinge is "living" in the sense that it is essentially friction free for movement.

Figure 5:
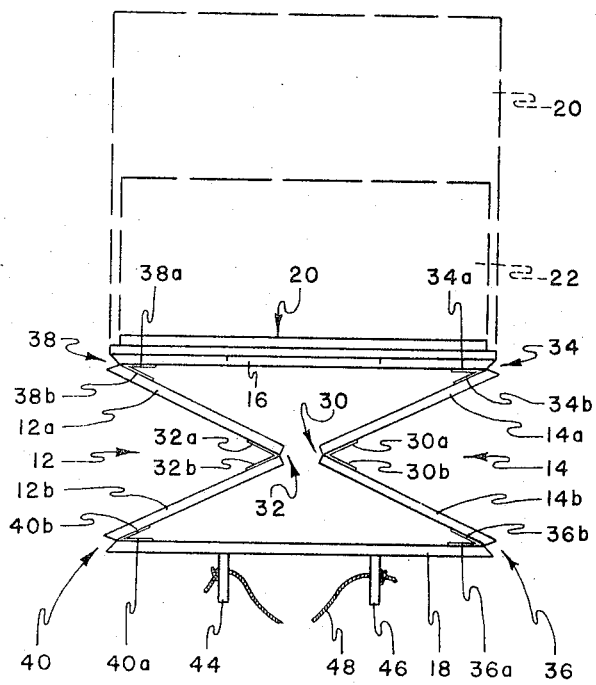
FIG. 5 is a front elevation view similar to FIG. 3 in a further collapsed position.

Referring now in detail to FIG. 5, both sidewall panels 12 and 14 are preferably comprised of first and second panel portions 12a, 12b, and 14a, 14b. Each of the panel portions are hinged along their entire length to each other as shown at 30 and 32 and to the respective front and rear panels 16 and 18 as shown at 34, 36 and 38, 40. Each of the hinges 30–40 include respective portions attached to each adjoined panel portion as shown at 30a, 30b, 32a, 32b, etc.

Figure 3:
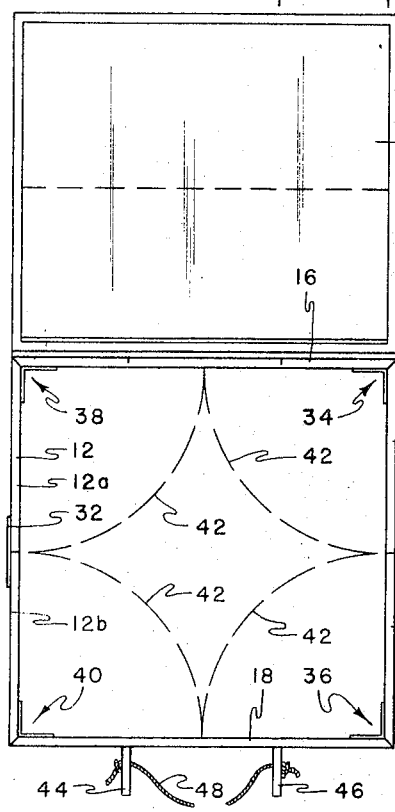
FIG. 3 is a front elevation view of the shanty on its side in the partially collapsed position illustrated in FIG. 2.
Figure 4:
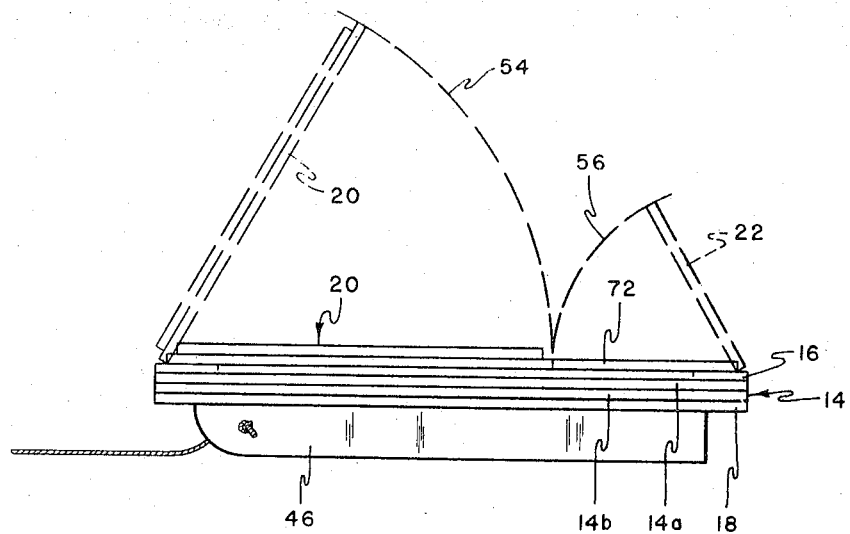
FIG. 4 is a side elevation view of the shanty on its side similar to FIG. 2 except that the shanty is in its fully collapsed position.

The folding capability of sidewalls 12 and 14 permit each of their respective panel portions 12a, 12b and 14a, 14b to fold between an erected position wherein each of the pairs of sidewall portions 12a, 12b and 14a, 14b are coplanar as illustrated in FIG. 3 to a collapsed position as partially illustrated in FIG. 5 in that the panel portions 12a, 12b and 14a, 14b are partially collapsed. The completely collapsed position is illustrated in FIG. 4 where the portions 14a and 14b are illustrated in a parallel plane relationship flush against each other. In this position, the panel portions 12a, 14a, and 12b, 14b will be coplanar.

The broken lines 42 (FIG. 3) illustrate the arc of rotation through which the sidewall portions 12a, 12b and 14a, 14b rotate between the erected and collapsed position. In the erected position, the sidewalls 12, 14 and front and rear walls 16 and 18 form a rectangular enclosure illustrated in FIG. 1. Preferably, the corners of each wall panel are beveled (FIG. 5) so that when the shanty is erected, the beveled edges of each panel mates with the adjacent panel to facilitate weather sealing.

In the prone positions illustrated in FIGS. 2–5, the entire structure whether collapsed or erected rests on a pair of runners 44 and 46 anchored to the outer surface of rear wall 18. A rope 48 is attached to the front end of each runner to facilitate pulling the collapsed structure across the ice.

Figure 2:
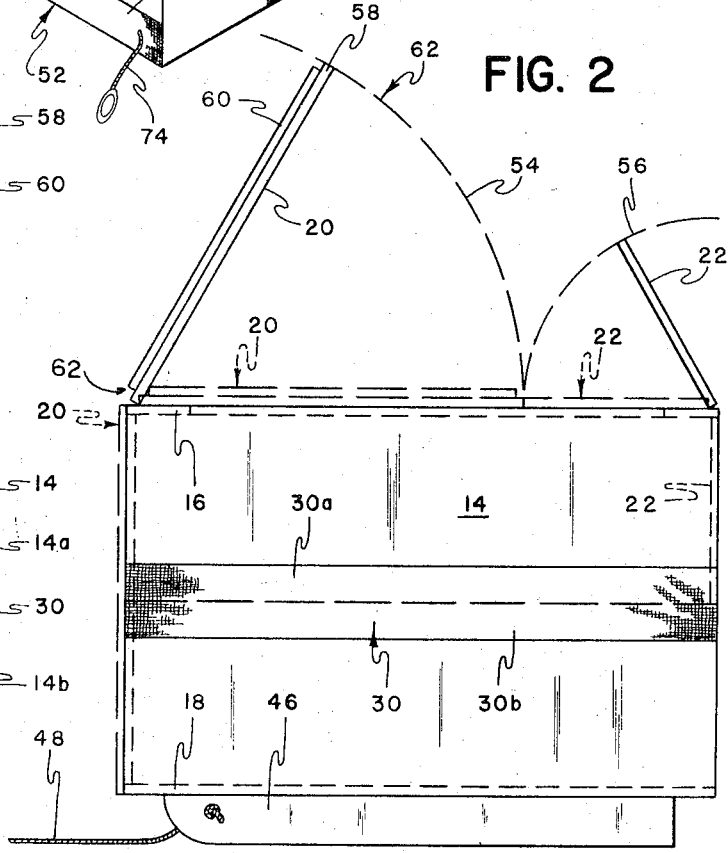
FIG. 2 is a side elevation view of the shanty on its side in a partially collapsed position.

Roof 20 and floor 22 are preferably hingedly connected to front wall 16 between a collapsed position illustrated in phantom in FIG. 2 wherein they lie flush in coplanar relationship on top of the outer surface of front panel 16 and an erected position wherein they close respectively the top and bottom of the shanty as illustrated in FIG. 1. A hinge 50 having portions 50a and 50b (FIG. 1) attaches roof 20 to front panel 16 in similar manner to the hinge portions 30–40 described previously. Likewise, floor 22 is hinged by hinge material 52 as illustrated in FIG. 1. The hinged rotation of roof 20 and floor 22 is illustrated by arcuate lines 54 and 56 shown in FIGS. 2 and 4. The combined length of roof 20 and floor 22 is preferably equal to the height of the shanty so that when the roof and floor are folded into the collapsed position as illustrated in FIG. 4, a complete thickness is formed.

Roof 20 has a double thickness with a top portion 58 and an inner portion 60 recessed slightly from the peripheral edges of top portion 58 forming a peripheral groove or recess 62 around the entirety of roof 20. The depth of groove 62 corresponds to the thickness of wall panels 12, 14, 16 and 18 so that when roof 20 is positioned in the erected position, the inner thickened portion of roof 20 acts as an index which holds the four wall panels in place and prevents unintentional folding of sidewalls 12 and 14 toward the collapsed positions.

As noted previously, the floor 22 does not extend across the entire floor area of the shanty but instead is comprised of a width approximately one-half the width of the shanty so that a rather enlarged opening 26 (FIG. 1) is provided through which fishing is conducted when the shanty is erected. As shown in the drawings, the floor is a single thickness having a length which is just less than the spacing between walls 12 and 14 so that it will fit up and between the walls. This also indexes the walls against inadvertent inward folding. Although not illustrated as such the floor optionally could include a double thickness wherein the inner thickness would perform the same function as described with respect to roof 20.

Referring back to FIG. 1, front panel 16 includes an opening 66 for ingress and egress to the shanty and an appropriately sized door 68 is provided which is hinged along one side of opening 66 in the same fashion as the previously described panels are hinged to each other. The outer peripheral edge of door 68 can be beveled to glove with a corresponding bevel on edge 72 of opening 66 so that when the door is shut, it is flush with panel 16. Since front panel 16 in the collapsed position lies beneath folded roof 20 and floor 22, the flush aspect is preferred as providing a uniform stacking of the various panels. Although not shown, both door 68 and roof 20 may include appropriate latching means to positively secure them in their closed position.

Referring yet to FIG. 1, tie down cords 74 are illustrated which may optionally be used to more positively secure the erected shanty to the ice to prevent toppling or movement in adverse weather. Similar tie down cords may be provided from back panel 18 although it will be appreciated that the tie down cords are not required.

OPERATION

Having described the various elements and their relationships with each other, the operation of the collapsible fishing shanty should be obvious. Referring to FIG. 4, the collapsed shanty is transported to the desired location on the ice by pulling it along its runners 44 and 46. When the collapsed shanty is adjacent the desired position, the operator simply lifts roof 20 from the position shown and pivots it as illustrated in phantom until it rests by its own weight all the way over through an arc of approximately 180°. The floor 22 is likewise rotated in the direction illustrated. The person erecting the shanty then grabs hold of front panel 16 and begins lifting it so that the shanty begins to take shape as illustrated in FIG. 5. By lifting front panel 16, the respective portions 12a, 12b and 14a, 14b of sidewall 12 and 14 fold relative each other out of their collapsed position into the position illustrated in FIG. 3. Once the position illustrated in FIG. 3 is achieved hinged roof 20 will have become lifted by its hinged connection to front panel 16 so that it needs only a final urgence into the proper position so that inner thickened portion 60 fits within the open top of the shanty and indexes the walls relative each other. The floor portion 22 is likewise positioned within the wall portions and the shanty is simply rotated from its prone position onto its base end over the desired fishing spot. The fishing hole through the ice may then be cut out inside the shanty or alternatively the hole could have been cut prior to tipping the shanty up from its prone position. It will be appreciated that variations of the operation described could be utilized with the same result and overall simplicity in both erecting and collapsing the shanty. The preferred operation in collapsing the shanty is but a reversal of the previously described erection.

As described above, the preferred composition of all of the panels utilized in the ice shanty of the invention is moded or foamed plastic which material provides both good heat insulating properties and is extremely rigid and durable. One significant advantage of the invention is the service life in that it requires little if any upkeep and no deterioration is realized. Also, the shanty in its collapsed state is extremely simple to store during its months of nonuse.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A collapsible ice shelter comprising, in combination: first and second pairs of opposed wall panels hingedly connected to each other, said first pair of wall panels having first and second panel portions hingedly connected to each other and to said second pair of wall panels, said first and second panel portions of said first pair of opposed wall panels being foldable between an erected position wherein each of said first and second panel portions lie in the same plane forming said first pair of opposed wall panels, said first and second pairs of opposed wall panels forming a rectangular enclosure, and a collapsed position wherein said first and second panel portions of said first pair of opposed wall panels are folded relative each other into parallel flush planes intermediate said second pair of opposed wall panels in accordion fashion; a roof and floor panel hingedly connected to one of said second pair of opposed wall panels and foldable relative said one panel between an erected position wherein said roof panel covers the top of said shelter and said floor panel covers at least a portion of the bottom of said shelter when said shelter is upright and said first pair of wall panels are in said erected position, and a collapsed position wherein said roof and floor panels are in a parallel flush plane with said one panel; one of said wall panels having means defining an access opening into and out of said shelter when erected and a door means hingedly connected to said one panel along one edge of said access opening to close said access opening, the floor of said shanty having means defining a fishing opening therein when erected; and a pair of runners fixed to the outer side of the other of said second pair of opposed wall panels, said other of said second pair of opposed wall panels and runners forming a sled for transporting said shelter when said panels are in collapsed position.

2. The ice shelter according to claim 1 wherein hinge means are provided for hingedly connecting said panels together, said hinge means comprising a living hinge of fabric-like material extending the entire length of each joint, said material being wind resistant so that said shelter when erected is completely enclosed and windproof.

3. The ice shelter according to claim 2 wherein said door means is a panel hingedly connected to said one panel by said hinge means, said door means when closed lying flush in the plane of said one panel.

4. The ice shelter according to claim 1 wherein said roof panel includes a depending center portion which fits snugly within the wall panels in the erected position indexing the wall panels into a rectangular configuration to inhibit unintentional folding movement of said panels toward said collapsed position.

5. The ice shelter according to claim 1 wherein said floor panel extends between said first pair of opposed wall panels and from one panel of said second pair of opposed wall panels but not to the other of said panels, the remaining distance between said floor panel and said other panel defining said fishing opening when said shanty is erected.

6. The ice shelter according to claim 1 wherein said floor panel fits snugly between said first pair of opposed wall panels in the erected position indexing the wall panels into a rectangular configuration and acting as a stop to inhibit unintentional folding movement of said panels toward said collapsed position.

7. The ice shelter according to claim 1 wherein the combined length of said roof and floor panels is approximately equal to the height of said wall panels.

8. The ice shelter according to claim 1 wherein the adjoining edges of each wall panel along each corner are beveled forming a glove relationship with each other when the shanty is erected.

9. The ice shelter according to claim 1 wherein said roof, floor, wall panels and door means are comprised of plastic, said panels and door means being completely interconnected and positioned in said erected position without requiring mechanical fasteners.

10. The ice shelter according to claim 1 wherein said first pair of opposed wall panels comprise the sidewalls of said shelter, said second pair of opposed wall panels comprising the front and rear panels, said one of said second pair of opposed wall panels comprising said front panel and the other of said second pair of opposed wall panels comprising said rear panel.

11. A collapsible shelter comprising, in combination:

first and second pairs of opposed plastic wall panels hingedly connected to each other by hinge means, said first pair of wall panels having first and second panel portions hingedly connected to each other and said second pair of wall panels by said hinge means, said first and second panel portions of said first pair of opposed wall panels being foldable between an erected position wherein said first and second panel portions lie in the same plane forming said first pair of opposed wall panels, said first and second pairs of opposed wall panels forming a rectangular enclosure, and a collapsed position wherein said first and second panel portions of said first pair of opposed wall panels are folded relative each other in parallel flush planes intermediate said second pair of opposed wall panels in accordion fashion; a plastic roof and floor panel hingedly connected to one of said second pair of opposed wall panels by said hinge means, and foldable relative said one panel between an erected position wherein said roof panel covers the top of said shelter and said floor panel covers at least a portion of the bottom of said shelter when said shelter is upright and said first pair of wall panels are in said erected position, and a collapsed position wherein said roof and floor panels are in parallel flush plane with said one panel, one of said wall panels having means defining an access opening into and out of said shelter and a plastic door means hingedly connected to said one panel by said hinge means along one edge of said access opening to close said access opening, the floor of said shanty having means defining a fishing opening therein; and a pair of runners fixed to the outer side of the other of said second pair of opposed wall panels, said other of said second pair of opposed wall panels forming a sled for transporting said shelter when said panels are in a collapsed prone position, said hinge means comprising a living hinge of fabric-like material extending the entire length of each joint, said material being wind resistant so that said shelter is completely enclosed and wind proof when erected and upright.

12. The shelter according to claim 11 wherein said roof panel includes a portion which fits snugly within the confines of said wall panels when said shelter is erected, said portion indexing said wall panels into said rectangular position and acting as a stop to inhibit unintentional folding movement of said wall panels toward said collapsed position.

* * * * *